UNITED STATES PATENT OFFICE.

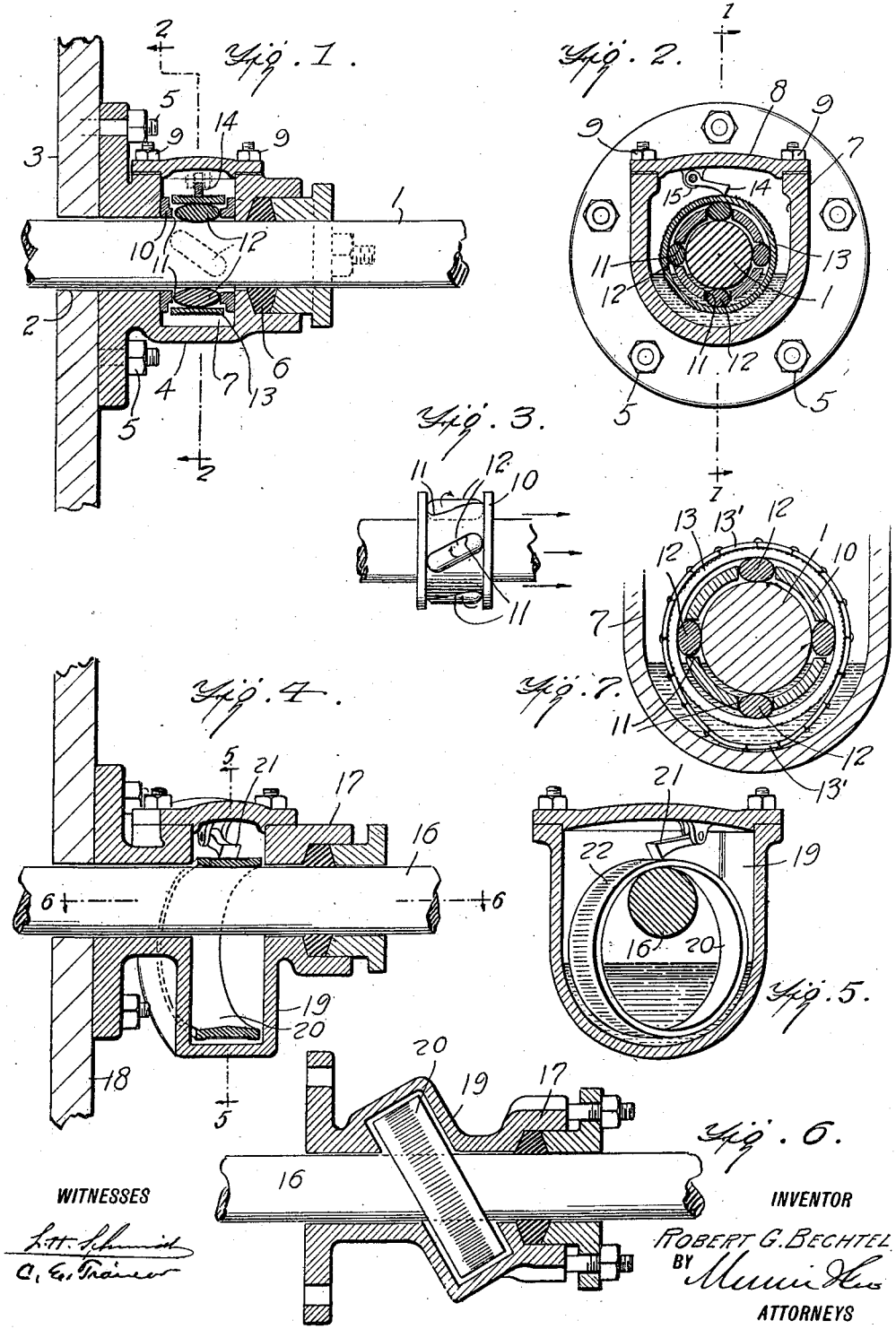

ROBERT GALBRAITH BECHTEL, OF GOODLAND, KANSAS.

LUBRICATOR.

1,230,651.  Specification of Letters Patent. Patented June 19, 1917.

Application filed August 14, 1916. Serial No. 114,754.

*To all whom it may concern:*

Be it known that I, ROBERT G. BECHTEL, a citizen of the United States, and a resident of Goodland, in the county of Sherman and State of Kansas, have invented an Improvement in Piston-Rod Lubricators, of which the following is a specification.

My invention is an improvement in piston rod lubricators, and has for its object to provide a mechanism of the character specified, for continuously applying a film of lubricant to a reciprocating member, as for instance a piston rod, wherein the means for applying the lubricant is controlled by the reciprocation of the piston rod.

In the drawings:

Figure 1 is a section on the line 1—1 of Fig. 2.

Fig. 2 is a section on the line 2—2 of Fig. 1, both views looking in the direction of the arrows adjacent to the lines.

Fig. 3 is a side view of the lubricant applying mechanism and the piston.

Fig. 4 is a section similar to Fig. 1 of a modified arrangement.

Figs. 5 and 6 are sections on the lines 5—5 and 6—6, respectively, of Fig. 4, each view looking in the direction of the arrows adjacent to the line.

Fig. 7 is a sectional view of a modified construction.

In the embodiment of the invention shown in Figs. 1 to 3 inclusive, the reciprocating member 1 which moves through the opening 2 in the wall of the casing 3 is inclosed by a packing or stuffing box 4, which is secured to the casing by the usual threaded stems and nuts 5, and a packing 6 is held in the outer end of the stuffing box or casing. The said stuffing box is provided with a recess or chamber 7 extending transversely of the reciprocating member 1, and the said chamber is a receptacle for lubricant, as indicated in Fig. 2. A cover 8 is provided for closing the said chamber, the cover being held in place by the usual nuts or threaded stems 9. Within this chamber is arranged a cage 10, the said cage consisting of a ring having marginal flanges, and provided with inclined openings 11, in which are arranged the rollers 12, the said rollers having their axes parallel and inclined with respect to the axis of the reciprocating member, in such manner that when the reciprocating member reciprocates the rollers will be rotated.

A ratchet ring 13 encircles the cage outside of the rollers between the flanges 10, the said ring having its periphery provided with teeth or roughened, for engagement by a pawl 14 which is hinged at 15 to the cover of the chamber or recess. It will be evident from the description, that when the reciprocating member moves in one direction, the rollers will be rotated, and they will carry with them the ring 13.

The ring dips into the lubricant in the chamber, and as the ring is rotated, a film of oil will be carried up by the said ring and will be deposited upon the reciprocating member. The pawl 14 prevents reverse movement of the cage and ring, causing the said cage and ring to rotate continuously in one direction.

In the embodiment of the invention shown in Figs. 4 to 6 inclusive, the reciprocating member 16 moves through the stuffing box 17, corresponding in arrangement to the stuffing box 14, and connected to the casing wall 18 in the usual manner. This stuffing box has a chamber 19 arranged transversely to the axis of the reciprocating member, and the plane of the chamber is inclined to the axis of the reciprocating member, as clearly indicated in Figs. 4 to 6. The said chamber is designed to contain lubricant, and the chamber is of a depth to permit the lubricating ring 20, arranged within the chamber, and resting loosely upon the reciprocating member, to depend freely into the chamber without touching the bottom thereof.

Because of the fact that the ring is held by the chamber in a position inclined with respect to the reciprocating member, it will be evident that when the said member reciprocates, the ring will be rotated in one direction, and the pawl 21 is provided for preventing reverse rotation, the said pawl engaging an annular series of teeth 22 on the periphery of the ring. It will be evident that during the movement of the reciprocating member the ring will be rotated continuously in one direction, and the said ring will carry up a coating of oil, which it will deposit upon the reciprocating member, thus retaining said member thoroughly lubricated.

It will be understood that the improved lubricating mechanism may be applied to reciprocating members of any character, as for instance, pistons, piston rods, and the like.

In Fig. 7 is shown a slightly modified form wherein the arrangement of the reciprocating member, the rollers, the cage, and the ring is precisely the same, but in addition to the lubricating ring a chain 13' is provided, the said chain loosely encircling the ring and dipping deep into the lubricant, as shown. After the lubricant has sunk so low in the recess that the ring cannot reach it, the chain will still carry lubricant, until it is entirely exhausted. The pawl may be used with this construction, or it may be omitted, but it will be evident that the chain may be used with the construction shown in Fig. 4.

I claim:

1. In combination with the reciprocating element and the casing for the same, of an oil receptacle extending transversely of the bore of the casing, a roller cage encircling the reciprocating member within the receptacle, said cage carrying rollers engaging the reciprocating member and extending beyond the periphery of the cage, the axes of the rollers being parallel and inclined with respect to the direction of movement of the reciprocating member, a lubricating ring resting upon the rollers, and dipping into the lubricant, and means for preventing reverse rotation of the ring.

2. In combination with the reciprocating element and the casing for the same, of an oil receptacle extending transversely of the bore of the casing, a lubricating ring encircling the reciprocating element within the receptacle and dipping into the lubricant, means arranged between the ring and the reciprocating element for rotating the ring as the element reciprocates, and means for constraining the ring to move in one direction.

3. In combination with the reciprocating element and the casing for the same, of an oil receptacle extending transversely of the bore of the casing, a lubricating ring encircling the reciprocating element within the receptacle and dipping into the lubricant, means in connection with the ring and the reciprocating element for rotating the ring as the element reciprocates and means for constraining the ring to rotate in one direction.

4. In combination with the reciprocating element and the casing for the same, of an oil receptacle extending transversely of the bore of the casing, a lubricating ring encircling the reciprocating element within the receptacle and dipping into the lubricant, and means in connection with the ring and the reciprocating element for rotating the ring as the element reciprocates.

5. In combination with the reciprocating element and the casing for the same, of an oil receptacle extending transversely of the bore of the casing, the plane of the receptacle being inclined with respect to the axis of the reciprocating element, a ring encircling the shaft and dipping into the oil in the receptacle and rotated by the movement of the reciprocating element, and means for constraining the ring to rotate in one direction.

6. In combination with the reciprocating element and the casing for the same, of an oil receptacle extending transversely of the bore of the casing, the plane of the receptacle being inclined with respect to the axis of the reciprocating element, and a ring encircling the shaft and dipping into the oil in the receptacle and rotated by the movement of the reciprocating element.

7. In combination with the reciprocating element and the casing for the same, of an oil receptacle extending transversely of the bore of the casing, a lubricating ring encircling the reciprocating element within the receptacle and dipping into the lubricant, means in connection with the ring and the reciprocating element for causing the ring to rotate as the element reciprocates, and an endless chain engaging about the ring and dipping into the lubricant in the receptacle and rotating with the ring.

8. In combination with the reciprocating element and the casing for the same, of an oil receptacle extending transversely of the bore of the casing, a lubricating ring encircling the reciprocating element within the receptacle and dipping into the lubricant, means in connection with the ring and the reciprocating element for causing the ring to rotate as the element reciprocates, and an endless flexible element loosely encircling the ring and dipping into the lubricant, for the purpose specified.

9. In combination with the reciprocating element and the casing for the same, of an oil receptacle extending transversely of the bore of the casing, a lubricating ring encircling the reciprocating element, and dipping into the lubricant, and an endless flexible element loosely encircling the ring and dipping into the lubricant.

10. In combination with the reciprocating element and the casing for the same, of an oil receptacle extending transversely of the bore of the casing, and a ring encircling the reciprocating element and dipping into the oil in the receptacle and rotated by the movement of the reciprocating element.

11. In combination with the reciprocating element and the casing for the same having an oil receptacle communicating with the bore of the casing, of means encircling the reciprocating element and dipping into the oil and rotated about the said element by the reciprocation of the same for lubricating the reciprocating element.

ROBERT GALBRAITH BECHTEL.